INVENTOR
R.D. GAMBRILL
BY [signature]
ATTORNEY

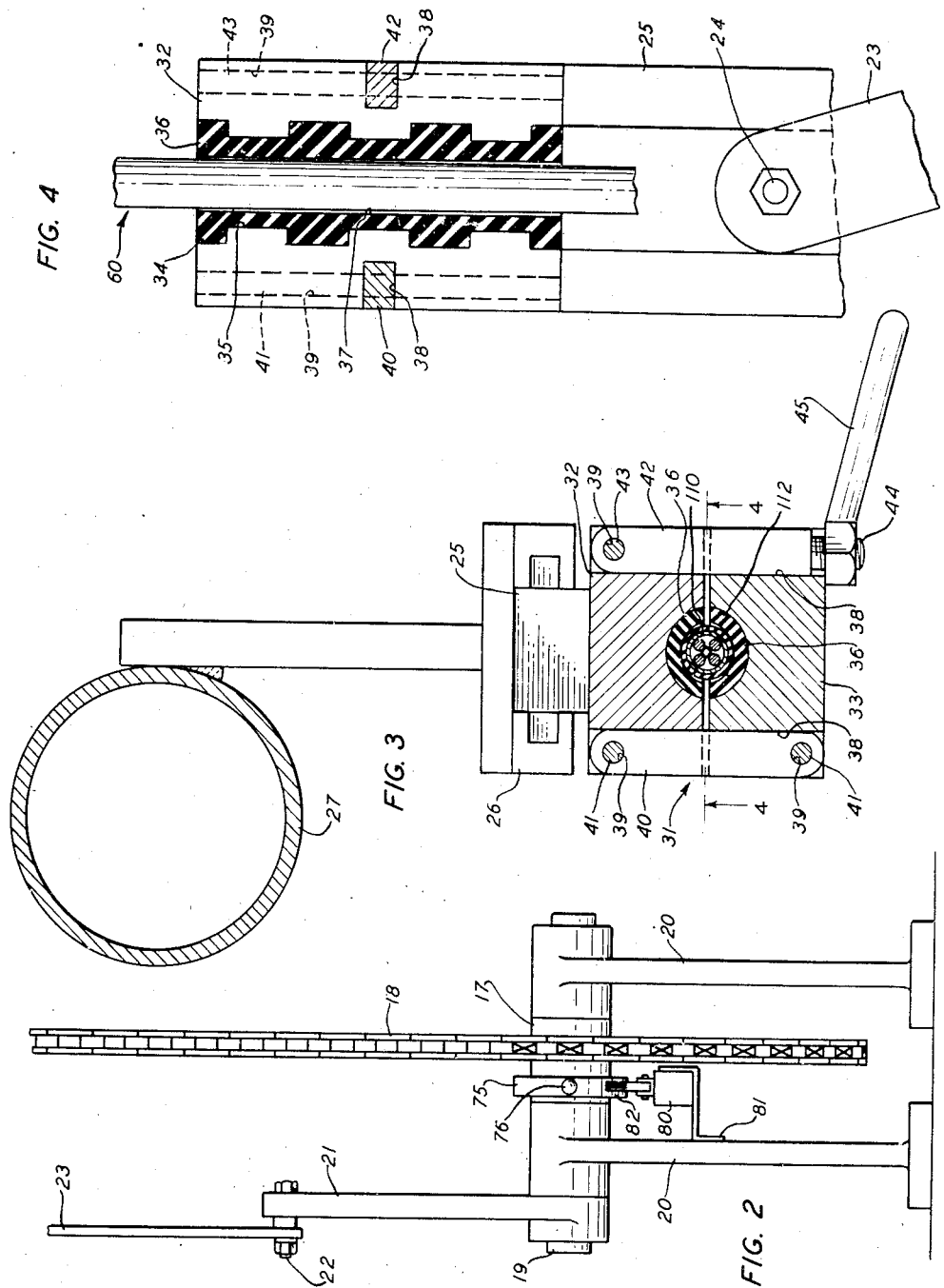

Aug. 23, 1949.    R. D. GAMBRILL    2,479,920
ELECTRIC MOTOR CONTROL SYSTEM
Filed Jan. 17, 1946    3 Sheets-Sheet 3

INVENTOR
R. D. GAMBRILL
BY
ATTORNEY

Patented Aug. 23, 1949

2,479,920

UNITED STATES PATENT OFFICE 2,479,920

ELECTRIC MOTOR CONTROL SYSTEM

Richard D. Gambrill, Baltimore, Md., assignor to Western Electric Company, Incorporated, New York, N. Y., a corporation of New York Application January 17, 1946, Serial No. 641,848

1 Claim. (Cl. 318—470)

This invention relates to electric motor control systems, and more particularly to electric control systems for use with apparatus for testing cable splices.

In the manufacture of multi-conductor electric cables, it is often necessary to splice normally manufactured lengths of cable together in order to form a cable whose length conforms to specific manufacturing specifications or is suitable for a particular field installation in which the cable is to be used. Cable splices are also necessitated by the fact that when insulation faults are detected in such cables the faulty portion must be removed from the cable and the ends thereof spliced together.

Various types of splices are employed in joining two lengths of cable, however, the present invention is related to the testing of a particular type which is formed by butting the ends of the individual conductors of the cable and causing a small amount of silver solder, or the like, to flow around the joint and join the ends thereof together. When the splice is completed, it is usually subjected to certain mechanical and electrical tests to determine whether the splice has been made properly and whether it will remain intact during normal handling in the field. The mechanical testing of such cable splices comprises flexing the splice while it is under tension, whereby substantial stresses are applied to the welded joints of the splice. If the welded joints are improperly formed they will break apart during the flexing test, which fact may be determined by having a simple continuity test set connected to the ends of the spliced cable during the flexing test.

An object of the invention is to provide new and improved electric motor control systems.

In accordance with a specific embodiment of the invention there is provided a continuity testing circuit comprising a plurality of indicating means connected in series with the individual conductors of a multi-conductor cable and a flexing drive motor control circuit comprising means for energizing the motor and means for deenergizing the motor after a predetermined number of cycles.

A clear understanding of the invention will be had from the following detailed description of a preferred embodiment thereof, when read in conjunction with the appended drawing, in which Fig. 1 is a side elevation of a cable splice flexing apparatus which may be used in connection with the electric motor control circuit embodying the invention;

Fig. 2 is a fragmentary end elevation of a portion of the driving mechanism shown in Fig. 1 as seen from the right hand side of that figure;

Fig. 3 is an enlarged horizontal sectional view of a portion of the apparatus taken along the line 3—3 of Fig. 1;

Fig. 4 is an enlarged sectional view of a portion of the apparatus taken along line 4—4 of Fig. 3.

Figure 1:
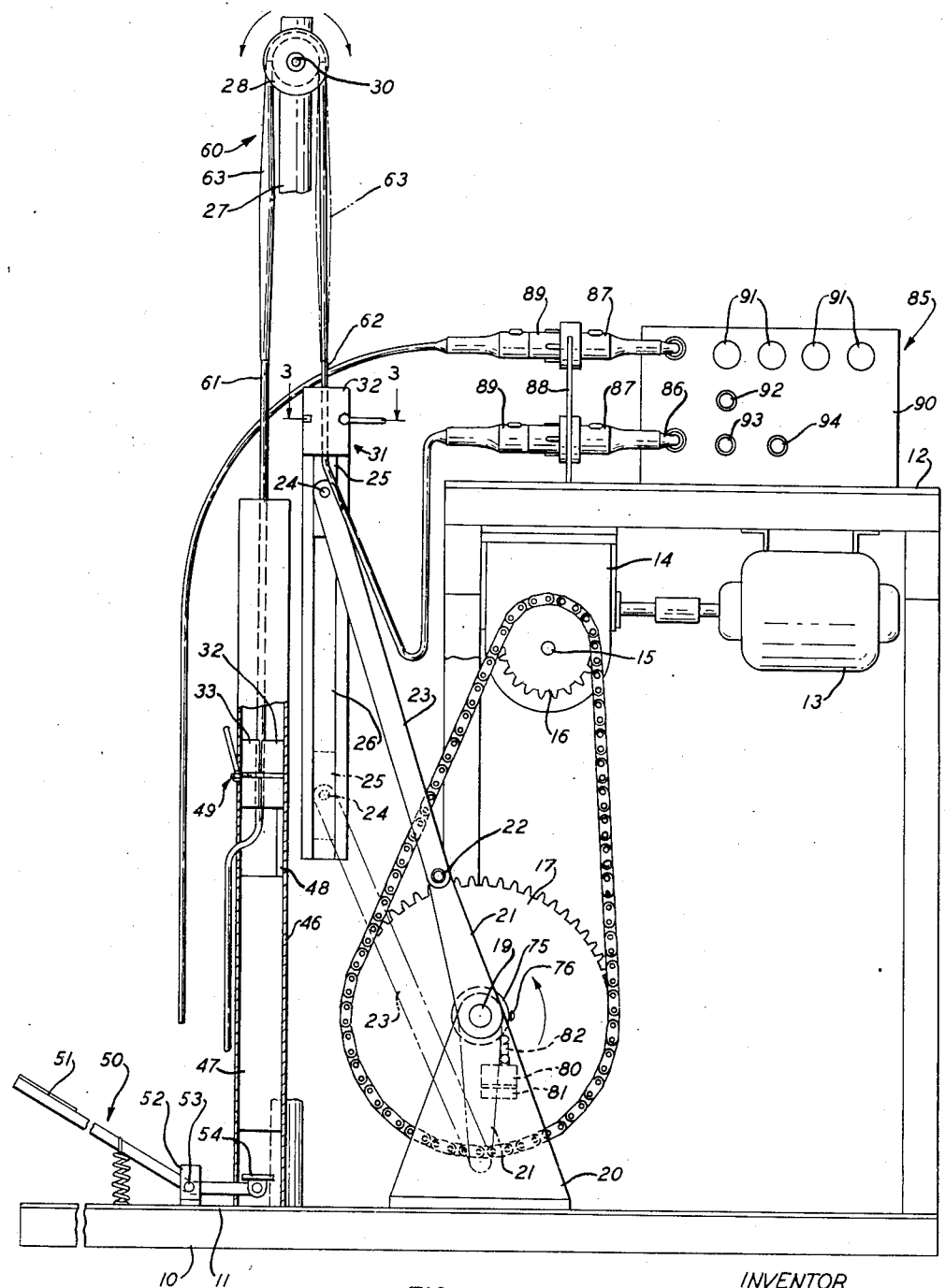

Referring more specifically to the drawings, and particularly to Fig. 1, the apparatus shown therein comprises a wooden platform 10 which is covered with a steel plate 11 and has mounted thereon a bench 12. A motor 13 is secured to the under side of the bench 12 and is directly connected to a gear reducer 14 also secured on the under side of the bench 12. An output shaft 15 of the gear reducer 14 has a sprocket 16 keyed thereon and serves to drive a sprocket 17 by means of a roller chain 18. The sprocket 17 is keyed to a crank shaft 19 which is rotatably mounted in a pair of bearings 20—20 which are rigidly secured to the plate 11. The crank shaft 19 has a crank 21 keyed on one end thereof, the other end of which is provided with a crank pin 22. A connecting rod 23 has one end thereof rotatably positioned on the crank pin 22. The other end of the connecting rod 23 is rotatably secured to a crosshead pin 24 mounted on a crosshead 25 which is slidably positioned in a slide 26. The slide 26 is rigidly secured to a column 27, which is mounted in an upright position on the plate 11 adjacent to the bench 12. The slide 26 is so positioned on the column 27 that, when the crank 21 is in the full line position shown on the drawing, the crosshead 25 is raised to the upper end of the slide 26 by the connecting rod 23. When the crank 21 is rotated to the broken line position shown on the drawing, the connecting rod 23 carries the crosshead 25 to the lower end of the slide 26.

A grooved pulley 28 is rotatably positioned on a shaft 30 rigidly mounted on the upper end of the column 27. The diameter of the pulley 28 is such that the center line of the groove therein is substantially in line with the center line of the crosshead 25 and the slide 26.

A suitable cable grip, such as a cable grip 31 (Figs. 3 and 4), is rigidly secured to the crosshead 25. The grip 31 is substantially identical with the one described and claimed in copending application Serial No. 529,518, filed April 4, 1944 by O. G. Nelson.

The cable grip 31 (Figs. 3 and 4) comprises a stationary block 32 and a movable block 33, each of which has a semicircular opening 34 provided on one face thereof and extending the entire length of the block, said openings 34—34 being provided with a plurality of semi-circular serrations 35—35 (Fig. 4). The semicircular openings 34—34 have rubber inserts 36—36 moulded therein whereby the serrations 35—35 serve to firmly secure the inserts 36—36 in the openings 34—34. Each of the rubber inserts 36—36 has a semicircular groove 37 moulded therein and extending the entire length of the insert 36. The blocks 32 and 33 have slots 38—38 milled in each side thereof for the full depth of the block, and a plurality of bores 39—39 drilled therein which connect with the slots 38—38.

The blocks 32 and 33 are assembled as shown in Fig. 3, so that the inserts 35—35 are adjacent to each other, whereby the semicircular grooves 37—37 therein are aligned to form a split bore therethrough. The stationary block 32 is rigidly secured to the crosshead 25 and has the movable block 33 hingedly attached thereto by means of a link 40 slidably positioned in the left hand slots 38—38 and rotatably positioned therein by a pair of rods 41—41 movably positioned in the left hand bores 39—39. The hinged block 33 is maintained in its closed position (Fig. 3) by means of a link 42 slidably positioned in the right hand slots 38—38 and has one end thereof rotatably mounted on a rod 43 positioned in the right hand bore 39 of the stationary block 32. The opposite end 44 of the link 42 is circular in cross-section and is threaded to receive a tightening lever 45. When the movable block 33 is maintained in its closed position (Fig. 3) with respect to the stationary block 32, the semicircular grooves 37—37 of the rubber inserts 36—36 form a split bore whose diameter is adjustable by means of the tightening lever 45.

There is also positioned on the plate 11 a hollow, sheet steel guide 46 of rectangular cross-section, in which a weight 47 is slidably positioned. The weight 47 is provided with a steel bracket 48 on its upper end to which a cable grip 49 is secured. The cable grip 49 is identical with the cable grip 31 secured to the crosshead 25 and described hereinabove.

A weight lifting mechanism 50 also is mounted on the plate 11 and comprises a treadle arm 51 rotatably mounted on a bearing 52 by means of a pin 53 positioned in the bearing 52. The treadle arm 51 extends beyond the bearing 52 into the weight guide 46 and has a pad 54 movably positioned on the end thereof. A spring 56 is positioned between the treadle arm 51 and the plate 11 in order to maintain the weight lifting mechanism 50 in its normal position.

The weight lifting mechanism 50 is designed to be actuated by the foot of an operator and serves to lift the weight a substantial distance above the platform 10 so that when the crosshead 25 is in its uppermost position as shown on the drawing, the weight 47 may be clamped to the left hand portion of a spliced cable 60 looped over the grooved pulley 28 and having a portion of its right hand side clamped in the cable grip 31 secured on the crosshead 25. The spliced cable 60 is made up of two lengths of multi-conductor cables 61 and 62, which are joined together by a splice 63.

The spliced cable 60 is looped over the pulley 28 (Fig. 1) so that the upper end of the splice 63 formed therein engages the left hand side of the pulley 28 when the crosshead 25 is in its uppermost position on the slide 26. When the crosshead 25 is moved to its lowermost position, the splice 63 will be drawn around the periphery of the pulley 28 and assume a position on the right hand side of the pulley 28 shown in the broken lines on the drawing (Fig. 1). In other words, each time the crosshead 25 moves from its uppermost position to its lowermost position or vice versa, the splice 63 of the cable 60 is drawn around the periphery of the pulley 28 whereby the splice 63 is bent around the pulley 28 approximately 180°. This flexing or bending of the splice 63 tends to fracture or break open improperly welded joints of the conductors of the spliced cable 60.

A ring 75 is adjustably positioned on the hub of the sprocket 17 and has threadedly mounted therein a round headed bolt 76. The ring 75 and the bolt 76 secured thereon are orientated with the crosshead 25 so that, when the motor 13 is deenergized after a given flexing operation of the splice 63, the crosshead 25 always comes to rest at approximately the upper end of the slide 26. A supersensitive switch 80 is mounted on a bracket 81 secured to one of the bearings 20—20, and has an operating arm 82 aligned with the ring 75 and the bolt 76 carried thereby. When the sprocket 17 is rotated, the ring 75 secured on the hub thereof is rotated, whereupon the head of the bolt 76 mounted thereon strikes the arm 82 of the supersensitive switch 80.

There is positioned on the top of the bench 12 a test set 85, which contains the electrical apparatus used to automatically control the operation of the motor 13 which drives the flexing apparatus shown in Fig. 1. A pair of leads 86—86 extend from the test set 85 and have a pair of connectors 87—87 provided on their ends, which are rigidly secured to an angular support 88 mounted on the bench 12 adjacent to the test set 85. A pair of connectors 89—89 provided on the ends of the cable 60 are similar to the connectors 87—87 but are of the opposite hand thereto so that they may be inserted into the connectors 87—87 of the test set leads 86—86. The test set 85 is provided with a control panel 90 on which is positioned a plurality of indicating lamps 91—91, a push button 92 associated with the indicting lamps, a start push button 93 and a stop push button 94.

The cable splice flexing apparatus shown in Fig. 1 is described and claimed specifically in copending application Serial No. 641,849, filed January 17, 1946, by C. E. Lewis.

Figure 5:
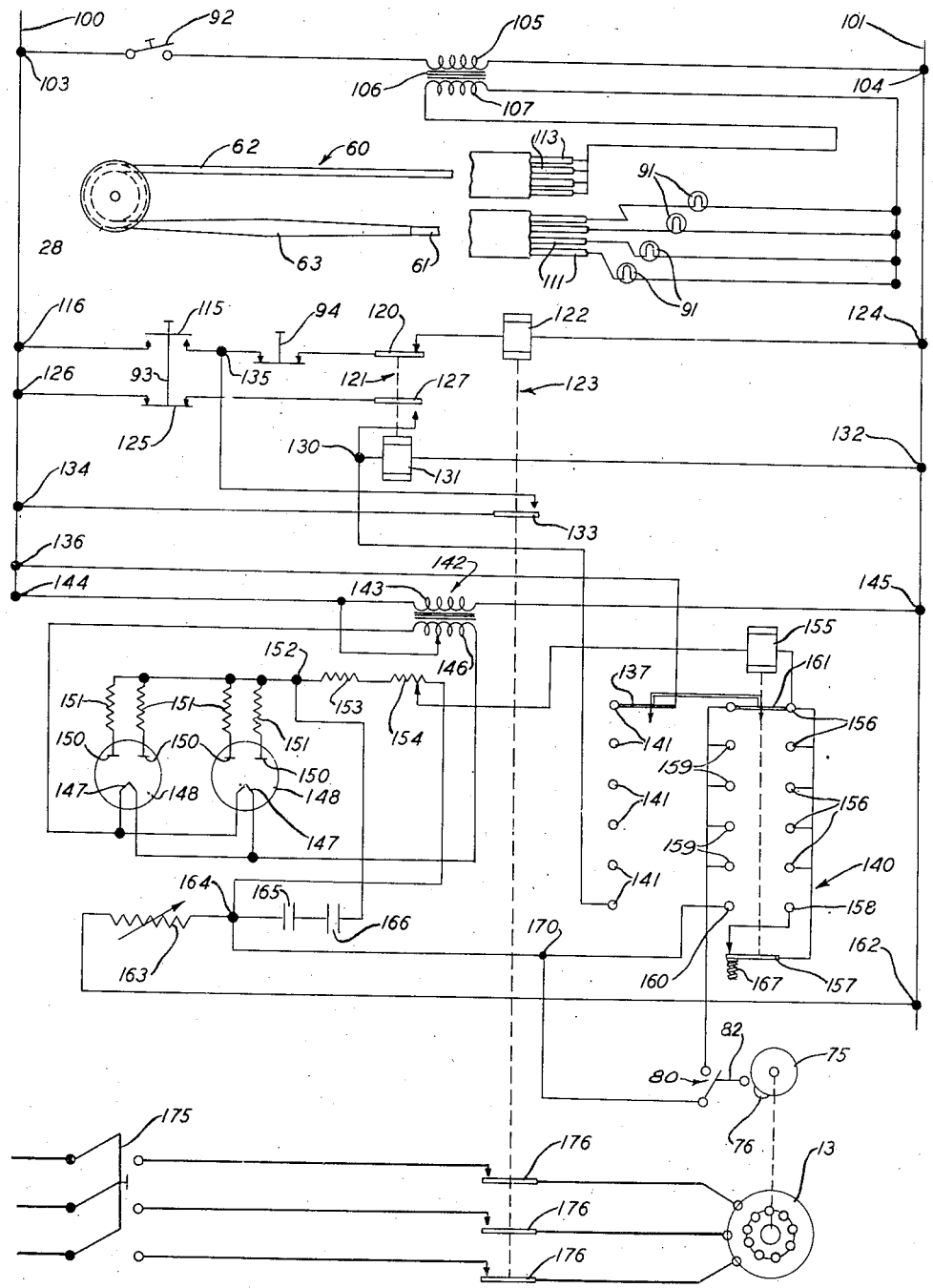
Fig. 5 is a schematic wiring diagram showing a spliced cable connected to a continuity indicating circuit and a control circuit employed to automatically control the motor driving the flexing apparatus shown in Fig. 1.

The apparatus contained in the test set 85 is shown in schematic form in Fig. 5 of the drawings, wherein a pair of 110 volt A. C. control busses 100 and 101 serve to supply potential to the continuity indicating circuit, and the motor control circuit.

As is shown in Fig. 5, the push button 92 is connected across the control buses 100 and 101 at junctions 103 and 104, respectively, and has connected in series therewith a primary winding 105 of a potential transformer 106. A secondary winding 107 of the transformer 106 has one side thereof connected directly to a plurality of individual conductors 113—113 of the multi-conductor cable 61 of the spliced cable 60. The multi-conductor cable 61 discussed hereinafter comprises four individually insulated conductors 111—111 enclosed by a metallic braid 110 which in turn has applied thereover an insulating packet 112.

The other side of the secondary winding 107 of the transformer 106 is connected to one side of each of the indicating lamps 91—91. Each of the indicating lamps 91—91 have their opposite sides connected to a plurality of conductors 111—111 of the multi-conductor cable 62 which is identical in construction with the cable 61. The spliced cable 60 contains the splice 63 in which the conductors 111—111 of the cable 61 and the conductors 113—113 of the cable 62 have been butt-welded by means of silver solder, or the like, and the respective joints have thereafter been individually insulated and enclosed in a braided metallic sleeve over which is placed an outer insulating jacket made of a material similar to that used in the jacket 112 of the cable 61.

When the push button 92 is closed, the potential transformer 106 is energized, whereupon the individual parallel circuits comprising the indicating lamps 91—91, the conductors 111—111 and 113—113 have impressed thereacross a potential sufficient to cause the indicating lamps 91—91 to glow, providing there are no breaks or defects in the joints between the individual conductors within the splice 63.

A normally open contact 115 (Fig. 5) of the start-push button 93 has one side thereof connected to a junction 116 on the bus 100 and the other side thereof connected to a normally closed contact of the stop-push button 94, which is in turn connected to a normally closed contact 120 of a control relay 121. The other side of the normally closed contact 120 is connected to an operating coil 122 of a magnetic relay 123 and has its other side connected directly to the control bus 101 at a junction 124. A normally closed contact 125 of the push button 93 has one side thereof connected to a junction 126 on the control bus 100 and has its other side thereof connected directly to a normally open contact 127 on the relay 121. The other side of the contact 127 is connected to a junction 130, which in turn is connected to a coil 131 of the relay 121 connected to a junction 132 on the bus 101. A normally open contact arm 133 has one side thereof connected directly to the bus 100 at a junction 134 and the other side thereof connected to a junction 135 positioned between the normally open contact 115 of the push button 93 and the normally closed contact of the stop-push button 94. The normally open contact 133 serves to bridge the normally open contact 115 of the starting push button 93 and maintain the relay 123 energized until the control circuit associated therewith is interrupted by operation of the relay 121. The stop push button 94 is inserted in the circuit of coil 122 as a safety feature, whereby the apparatus may be stopped at any time during its operation.

A junction 136 on the bus 100 is connected directly to a moving arm 137 of a conventional type of step selector 140. The junction 130 is also connected to a final contact 141 of a plurality of contacts 141—141 associated with the arm 137 of the step selector 140. A filament transformer 142 has its primary winding 143 connected directly across the control busses 100 and 101 at junctions 144 and 145, respectively. A secondary winding 146 of the filament transformer 141 is connected directly across filaments 147—147 of a pair of mercury vapor rectifier tubes 148—148. Each of the rectifier tubes 148—148 is provided with a filament 147, and a pair of anodes or plates 150—150. Each of the plates 150—150 are connected directly to one end of a resistor 151, and all of the resistors 151—151 have their opposite ends connected together and to a junction 152. The junction 152 is connected to a resistor 153 connected to another resistor 154 which in turn is adjustably connected to an operating coil 155 of the step selector 140. The rectifier tubes 148—148 and their associated resistors 151—151, 153 and 154 serve to supply the D. C. potential necessary to operate the step selector 140.

The other side of the coil 155 is connected to succeeding contacts 156—156 and to a normally closed contact arm 157, the other side of which is connected to a final contact 158 of the step selector 140. A plurality of contacts 159—159 are positioned adjacent to and horizontally aligned with the contacts 156—156. Another final contact 160 is positioned adjacent to and horizontally aligned with the final contact 158. The step selector 140 is provided with a movable arm 161 connected to the arm 137, whereby both the arm 137 and the arm 161 are operated simultaneously when the coil 155 is energized. The contact arm 157 is also opened each time the coil 155 is energized by the D. C. current. The arm 137 serves to successively engage the contacts 141—141 while the arm 161 serves to successively bridge across a pair of contacts consisting of one contact 156 and one contact 159, and across the final contacts 158 and 160.

A junction 162 on the bus 101 is connected directly to a variable resistor 163 which in turn is connected to a junction 164 and thence to the final contact 160 of the step selector 140. The junction 164 is also connected to a condenser 165 which is connected to another condenser 166 which in turn is connected to the junction 152. The condensers 165 and 166 serve to filter the D. C. potential supplied by the rectifier tubes 148—148 to the coil 155. The contact arm 157 of the step selector 140 is provided with a spring 167 which maintains the arm 157 in a normally closed position. A junction point 170, positioned between the junction point 164 and the final contact 160, is connected to a normally open super sensitive switch 80 which in turn is connected to the contacts 159—159 of the step selector 140. The super sensitive switch 80 is actuated by the round-headed bolt 76 positioned on the ring 75 which in turn is indirectly driven by the motor 13.

A source of A. C. potential is connected to a three-pole switch 175 (Fig. 5) connected to three normally open contacts 176—176 of the magnetic contactor 123, which in turn are connected to the motor 13.

The operation of the apparatus is as follows:

Assuming that the crosshead 25 is positioned at the top of the slide 26, the spliced cable 60 is looped over the grooved pulley 28 so that the splice 63 which is to be tested by the apparatus is positioned on the left hand side of the pulley 28. The cable length 62 of the spliced cable 60, which is positioned on the right hand side of the pulley 28, is placed in the cable grip 31 mounted on the cross head 25 and firmly held therein by turning the lever 45 so as to squeeze the cable 62 in the split bore provided by the inserts 36—36. The spliced cable 60 is held in a substantially taut position, whereupon the treadle arm 51 is depressed to lift the weight 47 a substantial distance above the platform 10. The cable length 62, which is below the splice 63, is placed in the cable grip 49 and firmly secured therein by turning its lever 45. The treadle arm 51 is now released, whereupon the weight 47 is carried entirely by the spliced cable 60 and serves to exert a substantial tension on the individual welded joints within the splice 63.

Having secured the spliced cable 60 in the cable grips 31 and 49, the connectors 89—89 of the cable are inserted into the connectors 87—87 of the test set 85. The spliced cable 60 is now connected to the continuity indicating circuit (Fig. 5), whereupon the push button 92 associated therewith is actuated to close the energizing circuit of the transformer 106, thereby causing the indicating lamps 91—91 to glow, which fact indicates that the conductors 111—111 of the cable length 61 are now making good electrical contact with the conductors 113—113 of the cable length 62.

The push button 92 is maintained in the closed position and the start push button 93 is actuated, thereby closing the circuit to the operating coil 122 of the magnetic contactor 123 which when energized closes its control contact 133 and its motor circuit contacts 176—176. The contact 133 provides a holding circuit for the coil 122 so that the push button 93 may be released after the contact 133 has closed. Assuming that the three-pole switch 175 is closed, the contacts 176—176 serve to apply potential to the motor 13, whereupon the motor is energized and reciprocates the crosshead 25 along the slide 26.

As the crosshead 25 is driven to its lower position on the slide 26, the splice 63 is drawn around the periphery of the pulley 28, and assumes a position on the right hand side of the pulley directly above the crosshead slide 26, and the weight 34 is raised to its uppermost position in the guide 33. On the return stroke of the crosshead 25, the splice 63 passes back over the periphery of the pulley 28 and assumes its normal starting position on the left hand side of the pulley, and the weight 34 returns to its lowermost position. At the same time, the roundheaded bolt 76 has made a complete revolution and actuated the operating arm 82 of the microswitch 80, thereby closing the D. C. circuit to the coil 155 of the step selector 140, whereupon the arms 137 and 161 are advanced to their respective No. 1 positions. As the bolt 76 of the ring 75 passes over the operating arm 82 of the microswitch 80, the D. C. circuit to the coil 155 is opened and the arms 137 and 161 remain in their advanced position. The motor 13 continues to reciprocate the crosshead 25 until the bolt 76 makes five complete revolutions and actuated the microswitch 80 five times, at which point the arms 137 and 161 of the step selector 140 have been advanced to their respective final contacting positions. The arm 137 now engages the final contact 141 and closes the circuit to the coil 131 of the relay 121 and thereby energizes the relay 121 which opens its contact 120 and closes its contact 127. When the contact 120 has been thus actuated, the holding circuit for the coil 122 is broken whereby the relay 123 is deenergized. The contacts 176—176 of the relay 123 are thereby opened and disconnect the motor 13 from the source of potential whereupon the flexing apparatus is no longer operated. When the arm 161 bridges across the final contacts 158 and 160, the D. C. circuit to the coil 155 is maintained through the contact arm 157 and is supplied directly from the junction 162 and the resistor 154. At this point the coil is energized until it opens the contact arm 157, whereupon the arms 137 and 161 advance another step. The spring 167 recloses the contact arm 157 and the coil 155 is again energized whereby the arms 137 and 161 are advanced another step. The step selector 140 continues to operate in this manner until the arms 137 and 161 return to their normal starting positions. However, the relay 121 remains energized through its hold-in contact 127 and another flexing operation cannot be initiated until the push button 93 is actuated so that its contact 125 is momentarily opened thereby breaking the holding circuit of the coil 131. When the arms 137 and 161 are returned to their normal starting positions, they do not interrupt their associated control circuits while they are energized due to the fact the contact arm 157 has previously opened the D. C. circuit to the coil 155 and the contact 127 of the relay 121 is held in a closed position maintaining the coil 131 energized even though the arm 137 has been withdrawn from its final contact 141.

The splice 63 of the spliced cable 60 has now been flexed ten times due to the automatic operation of the flexing apparatus and, therefore, is ready to be removed therefrom. During the flexing operation the operator is required to hold the push button 92 in a closed position in order to determine whether the butt-welded joints within the splice 63 remain intact during the flexing operation, which fact is indicated by the lamps 91—91. In other words, should any one of the lamps 91—91 be darkened during the flexing operation, it would indicate that one of the welded joints within the splice 63 has been broken and caused to separate during the flexing operation.

After the motor 13 has been automatically stopped by the intermittent operation of the step selector 140, the push button 92 is released and the spliced cable 60 removed from the testing apparatus so that another spliced cable may be positioned thereon and connected to the test set as described above. The splice of the cable now positioned on the apparatus is subjected to the plurality of flexing operations like that described for the spliced cable 60.

While the above described apparatus is particularly adapted to test and flex cable splices of the type described, it is to be understood that it may be modified to test other types of cable splices and other types of cables without departing from the scope of the invention as defined in the appended claim.

What is claimed is:

In a motor driven apparatus arranged to flex a splice joining a plurality of conductors of two cables and including a testing circuit in which the individual conductors of a cable having a splice therein may be connected for indicating any failures in the continuity of the conductors at the splice, the improved means for automatically controlling the operation of the apparatus, which comprises a control circuit, a motor circuit, said control circuit including a magnetic relay for closing the motor circuit to start the motor, manually operable means for energizing said magnetic relay and a seond magnetic relay energizable to deenergize the first-mentioned magnetic relay, a D. C. control circuit, normally open switching means for controlling the continuity of the D. C. control circuit, a step selector relay connected to be energized upon each closure of the D. C. control circuit, a movable arm operable by the step selector relay for energizing the second magnetic relay after said arm has been advanced a predetermined number of steps, a second movable arm operable by the step selector switch for successively connecting the step selector relay to the D. C. circuit each time the D. C. circuit is closed, a contact arm actuated when the step selector relay is energized to return the first and second movable arms to their starting position after a predetermined number of operations thereof, and means driven by the motor for intermittently actuating the switching means controlling the continuity of the D. C. circuit, whereby when the D. C. circuit is intermittently closed it intermittently energizes the step selector relay which advances the movable arms step by step until the second relay is energized and deenergizes the first-mentioned relay which interrupts the motor circuit and stops the motor.

RICHARD D. GAMBRILL.

REFERENCES CITED

The following references are of record in the file of this patent:

UNITED STATES PATENTS

| Number | Name | Date |
| --- | --- | --- |
| 889,993 | Vaughan et al. | June 9, 1908 |
| 999,947 | Barnum | Aug. 8, 1911 |
| 1,435,314 | LaVercombe | Nov. 14, 1922 |
| 1,436,323 | Schnable et al. | Nov. 21, 1922 |
| 1,785,690 | Buffum | Dec. 16, 1930 |
| 1,853,960 | Cunningham | Apr. 12, 1932 |
| 1,882,815 | Haegle et al. | Oct. 18, 1932 |
| 2,290,198 | More | July 21, 1942 |
| 2,362,690 | Fichter et al. | Nov. 14, 1944 |
| 2,393,177 | Longfellow | Jan. 15, 1946 |
| 2,413,137 | Dederick | Dec. 24, 1946 |

FOREIGN PATENTS

| Number | Country | Date |
| --- | --- | --- |
| 95,885 | Switzerland | Aug. 16, 1922 |